United States Patent
Ham (10) Patent No.: US 12,046,421 B2
(45) Date of Patent: Jul. 23, 2024

(54) MULTILAYER ELECTRONIC COMPONENT AND DIELECTRIC COMPOSITION

(71) Applicant: SAMSUNG ELECTRO-MECHANICS CO., LTD., Suwon-si (KR)

(72) Inventor: Tae Young Ham, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 183 days.

(21) Appl. No.: 17/501,215

(22) Filed: Oct. 14, 2021

(65) Prior Publication Data
US 2022/0181082 A1 Jun. 9, 2022

(30) Foreign Application Priority Data
Dec. 9, 2020 (KR) .................. 10-2020-0171348

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *H01G 4/30* (2013.01);
(Continued)

(58) Field of Classification Search
CPC ........ H01G 4/30; H01G 4/012; H01G 4/1227; C04B 35/4682; C04B 2235/3236;
(Continued)

(56) References Cited

U.S. PATENT DOCUMENTS

2014/0313634 A1* 10/2014 Yoon .................. H01G 4/30
                                                                 501/137
2017/0190626 A1* 7/2017 Yoon .................. H01G 4/1227
(Continued)

FOREIGN PATENT DOCUMENTS

| KR | 10-2014-0125000 A | 10/2014 | |
|---|---|---|---|
| KR | 2019116113 A * | 10/2019 | ............... H01G 2/02 |
| KR | 10-2116675 B1 | 5/2020 | |

OTHER PUBLICATIONS

Amador C. Caballero, et al., "Grain Growth Control and Dopant Distribution in ZnO-Doped BaTiO3", J. Am. Ceram. Soc., vol. 81, No. 4, 1998, pp. 939-944.
(Continued)

*Primary Examiner* — Arun Ramaswamy
(74) *Attorney, Agent, or Firm* — MORGAN, LEWIS & BOCKIUS LLP (57) ABSTRACT

A multilayer electronic component includes a body including a plurality of dielectric layers, wherein, wherein a central portion of the capacitance formation portion is Aa, a boundary portion of the capacitance formation portion, adjacent to the cover portions, is Ab, a dielectric grain size corresponding to the top 50% of dielectric grains, in order of enlargement, from the smallest grain size, among a plurality of dielectric grains included in Aa, is D50a, and a dielectric grain size corresponding to the top 50% of dielectric grains, in order of enlargement, from the smallest grain size, among a plurality of dielectric grains included in Ab, is D50b, D50a satisfies 190 nm or less and D50b satisfies 120 nm or greater.

15 Claims, 8 Drawing Sheets

(51) Int. Cl.
    *H01G 4/012*     (2006.01)
    *H01G 4/30*     (2006.01)

(52) U.S. Cl.
    CPC ............ *C04B 2235/3236* (2013.01); *C04B 2235/3244* (2013.01); *C04B 2235/3284* (2013.01); *C04B 2235/5454* (2013.01); *C04B 2235/781* (2013.01); *C04B 2235/783* (2013.01); *C04B 2235/785* (2013.01); *C04B 2235/95* (2013.01); *H01G 4/012* (2013.01)

(58) Field of Classification Search
    CPC .... C04B 2235/3244; C04B 2235/3284; C04B 2235/5454; C04B 2235/781; C04B 2235/783; C04B 2235/785; C04B 2235/95
    USPC ... 361/301.4, 321.5, 311, 312, 321.1, 321.4; 501/137
    See application file for complete search history.

(56) References Cited

U.S. PATENT DOCUMENTS

| | | | |
|---|---|---|---|
| 2018/0033555 A1* | 2/2018 | Yoon | H01G 4/30 |
| 2018/0090272 A1* | 3/2018 | Nagaoka | H01G 4/232 |
| 2018/0265413 A1 | 9/2018 | Okamoto | |

OTHER PUBLICATIONS

E. R. Segnit et al., "The Ternary System BaO—ZnO—SiO2", Aust. J. Chem., 1970, vol. 23, pp. 1077-1085.

* cited by examiner

MULTILAYER ELECTRONIC COMPONENT AND DIELECTRIC COMPOSITION

CROSS-REFERENCE TO RELATED APPLICATION(S)

This application claims benefit of priority to Korean Patent Application No. 10-2020-0171348 filed on Dec. 9, 2020 in the Korean Intellectual Property Office, the disclosure of which is incorporated herein by reference in its entirety.

BACKGROUND

1. Field

The present disclosure relates to a multilayer electronic component and a dielectric composition.

2. Description of Related Art

A multilayer ceramic capacitor (MLCC), a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for relatively small size and relatively high capacitance of multilayer ceramic capacitors is increasing.

In order to achieve relatively small size and relatively high capacitance of multilayer ceramic capacitors, it is necessary to increase the number of layers by reducing a thickness of a dielectric layer and a thickness of an internal electrode. Currently, the thickness of the dielectric layer has reached about 0.6 μm, and thinning thereof is ongoing.

However, as the thickness of the dielectric layer decreases, a relatively large electrical field may be applied per unit thickness. In generally, as a grain size therein increases, a grain boundary fraction may decrease. Therefore, problems such as an increase in a dissipation factor (DF), a decrease in breakdown voltage, and the like, may be generated to have a risk of deterioration of reliability.

In order to solve these problems, a new method is required to ensure high reliability not only in terms of a structure of a multilayer ceramic capacitor, but also especially in terms of a dielectric composition thereof.

If a dielectric composition, currently, capable of increasing reliability is secured, a multilayer ceramic capacitor to be further thinned may be manufactured.

SUMMARY

An aspect of the present disclosure is to provide a dielectric composition and a multilayer electronic component, having excellent reliability.

An aspect of the present disclosure is to provide a dielectric composition and a multilayer electronic component, capable of implementing a uniform non-granular growth system.

However, the objects of the present disclosure are not limited to the above description, and will be more easily understood in the process of describing specific embodiments of the present disclosure.

According to an aspect of the present disclosure, a dielectric composition includes a $BaTiO_3$ main component and a first minor component, wherein the first minor component includes Zn and Zr, wherein an amount of Zn is higher than 0.2 mol and 0.5 mol or less, relative to 100 mol of Ti of the main component, and an amount of Zr is higher than 0 mol and 2 mol or less, relative to 100 mol of Ti of the main component.

According to another aspect of the present disclosure, a multilayer electronic component includes a body including a plurality of dielectric layers, first and second surfaces opposed from each other in a first direction, third and fourth surfaces connected to the first and second surfaces and opposed from each other in a second direction, and fifth and sixth surfaces connected to the first to fourth surfaces and opposed from each other in a third direction; and external electrodes disposed on the third and fourth surfaces, wherein the body includes a capacitance formation portion including an internal electrode alternately arranged with the dielectric layer, and cover portions arranged above and below the capacitance formation portion in the first direction, wherein, when a central portion of the capacitance formation portion is Aa, a boundary portion of the capacitance formation portion, adjacent to the cover portions, is Ab, a dielectric grain size corresponding to the top 50% of dielectric grains, in order of enlargement, from the smallest grain size, among a plurality of dielectric grains included in Aa, is D50a, and a dielectric grain size corresponding to the top 50% of dielectric grains, in order of enlargement, from the smallest grain size, among a plurality of dielectric grains included in Ab, is D50b, D50a satisfies 190 nm or less and D50b satisfies 120 nm or greater.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

Dielectric Composition

A dielectric composition according to an embodiment of the present disclosure may include a $BaTiO_3$ main component and a first minor component, the first minor component may include Zn and Zr, and an amount of Zn may be higher than 0.2 mol and 0.5 mol or less, relative to 100 mol of Ti of the main component, and an amount of Zr may be higher than 0 mol and 2 mol or less, relative to 100 mol of Ti of the main component.

In order to achieve relatively small size and relatively high capacitance of the multilayer ceramic capacitor, it is necessary to increase the number of layers by reducing a thickness of a dielectric layer and a thickness of an internal electrode. Currently, the thickness of the dielectric layer has reached about 0.6 μm, and thinning thereof is ongoing. As the thickness of the dielectric layer decreases, a relatively large electrical field may be applied per unit thickness. In generally, as a grain size thereof increases, a grain boundary fraction may decrease. Therefore, problems such as an increase in dissipation factor (DF), a decrease in breakdown voltage, and the like may be generated to have a risk of deterioration of reliability. In general, it is known that an increase in dissipation factor (DF), an increase in effective capacitance change rate, a decrease in breakdown voltage, or the like may be due to distribution of dielectric grain size accompanied by abnormal granular growth.

Therefore, in order to solve these problems, it is necessary to have a microstructure having a small dielectric grain size and a uniform grain size for each position.

In the present disclosure, Zn and Zr may be added together to provide a uniform non-granular growth system of dielectric grains and densification at a low temperature, to minimize a decrease in capacitance, and control microstructure distribution by position.

According to an embodiment of the present disclosure, Zn may be added to $BaTiO_3$ main component in an amount of higher than 0.2 mol and 0.5 mol or less, relative to 100 mol of Ti of the main component, and Zr may be added to the main component in an amount of higher than 0 mol and 2 mol or less, relative to 100 mol of Ti of the main component, to achieve a low-temperature densification while implementing a uniform non-granular growth system of dielectric grains, minimize capacitance degradation, and control distribution of microstructures by position. Therefore, effects such as suppression of a decrease in capacitance, a decrease in dissipation factor (DF), improvement of breakdown voltage, or the like may be secured to improve reliability of a multilayer electronic component.

Hereinafter, each component of a dielectric composition according to an embodiment of the present disclosure will be described in more detail.

a) Main Component

A dielectric composition according to an embodiment of the present disclosure may include a main component represented by $BaTiO_3$.

When a dielectric layer is thinly formed to have a thickness of less than 1.0 μm according to demand for relatively small size and relatively high capacitance, fine powder particles of 100 nm or less may generally be used. The smaller a size of the powder particles, the greater driving force for granular growth. It may be difficult to obtain a uniform microstructure due to possibility of increasing occurrence of abnormal granular growth.

According to an embodiment of the present disclosure, since Zn and Zr may be added in combination to suppress granular growth, and induce liquid phase sintering during baking, to improve densification, a uniform non-granular growth system of dielectric grains may be implemented.

Therefore, when an average particle diameter of the powder particles as the main component is 100 nm or less, an effect of implementing the uniform non-granular growth system according to the present disclosure may be more effective.

b) First Minor Component

According to an embodiment of the present disclosure, a dielectric composition may include Zn and Zr as elements of a first minor component, an amount of Zn may be higher than 0.2 mol and 0.5 mol or less, relative to 100 mol of Ti of the main component, and an amount of Zr may be higher than 0 mol and 2 mol or less, relative to 100 mol of Ti of the main component.

Zr may play a role in suppressing granular growth. In addition, in Zr, $Zr^{4+}$ may be substituted with $Ti^{4+}$ when ion doping in $BaTiO_3$, and charge compensation may not be required. Therefore, an influence of defect chemistry may be minimized even when an excessive amount is added. Defect chemistry refers to a chemical reaction that may occur when $BaTiO_3$ is defective. $BaTiO_3$ may have an electron valence of 2+ in a case of Ba and an electron valence of 4+ in a case of Ti. In a case of a composition to be added, when added in a form of an oxide, substitution may be performed with an oxide of 2+ to 5+. In order to always satisfy an electric neutral state, electrons, holes, Ba vacancy, Ti vacancy, oxygen vacancy, or the like may occur according to chemical reactions.

A lower limit to an amount of Zr is not particularly limited. In order to sufficiently secure an effect of suppressing growth of crystal grains, 0.1 mol or higher is more preferable.

When an amount of Zr is higher than 2 mol, an effect of suppressing growth of crystal grains due to addition of Zr may be saturated. Therefore, an amount of Zr may be 2 mol or less.

Zn may have a low melting point, and may play a role in aiding low-temperature densification sintering. In this case, Zn may be added in a form of ZnO, an oxide.

From a BaO—$SiO_2$—ZnO phase diagram, it can be seen that a liquid phase may be formed at a low temperature of 1150° C. or less by addition of ZnO. For example, liquid phase sintering may be induced during sintering by ZnO to improve densification.

When an amount of Zn is 0.2 mol or less, formation of the liquid phase may be insufficient, and an effect of improving densification may be insufficient. When an amount of Zn is higher than 0.5 mol, a breakdown voltage may be lowered.

In addition, as amounts of Zn and Zr are satisfied, a size of a dielectric grain may be reduced, and distribution of sizes of dielectric grains in a central portion and a boundary portion of a capacitance formation portion may be reduced. For example, if the central portion of the capacitance formation portion Ac is Aa, a boundary portion of the capacitance formation portion Ac, adjacent to a cover portion, is Ab, a dielectric grain size corresponding to the top 50% of dielectric grains, in order of enlargement, from the smallest grain size, among a plurality of dielectric grains included in Aa, is D50a, and a dielectric grain size corresponding to the top 50% of dielectric grains, in order of enlargement, from the smallest grain size, among a plurality of dielectric grains included in Ab, is D50b, D50a may be 190 nm or less, and D50b may be 120 nm or greater.

A dielectric constant of a dielectric composition according to an embodiment of the present disclosure at room temperature is not particularly limited, but, for example, the dielectric constant at room temperature may be 2000 or higher.

c) Second Minor Component

According to an embodiment of the present disclosure, a dielectric composition may include an oxide or a carbonate, including at least one of Mn, V, Cr, Fe, Ni, Co, or Cu as a second minor component.

As the second minor component including at least one of Mn, V, Cr, Fe, Ni, Co, or Cu may be included in an amount of from 0.1 to 2.0 mol, relative to 100 mol of Ti of the main component. The second minor component may be in a form of oxide or carbonate.

The second minor component may play a role in lowering a baking temperature and improving high-temperature withstand voltage characteristics of a multilayer ceramic capacitor to which a dielectric composition is applied.

An amount of the second minor component may be an amount included with respect to 100 mol of Ti of the main component, and may be particularly defined as mol of metal ions included in the dielectric composition, relative to 100 mol of Ti of the main component.

When an amount of the second minor component is less than 0.1 mol, a baking temperature may increase, and high-temperature withstand voltage characteristics may be slightly lowered.

When an amount of the second minor component is more than 2.0 mol, high-temperature withstand voltage characteristics and room temperature specific resistance may decrease.

In particular, a dielectric composition according to an embodiment of the present disclosure may include a second minor component having an amount of from 0.1 to 2.0 mol, relative to 100 mol of the main component, to enable low-temperature baking and obtain high high-temperature withstand voltage characteristics.

d) Third Minor Component

According to an embodiment of the present disclosure, a dielectric composition may include a third minor component including at least one selected from the group consisting of Y, Dy, Ho, Sm, Gd, Er, La, Ce, Tb, Tm, Yb, or Nd. The third minor component may be in a form of oxide or carbonate.

The third minor component may be included in an amount of 4.0 mol or less, relative to 100 mol of Ti of the main component.

An amount of the third minor component may be a total amount of elements of Y, Dy, Ho, Sm, Gd, Er, La, Ce, Tb, Tm, Yb and/or Nd included in the third minor component, without distinguishing an additional form such as oxides or carbonates.

For example, the sum amounts of the element of Y, Dy, Ho, Sm, Gd, Er, La, Ce, Tb, Tm, Yb, and/or Nd included in the third minor component may be 4.0 mol or less, relative to 100 mol of Ti of the main component.

The third minor component may play a role in preventing deterioration of reliability of a multilayer ceramic capacitor to which the dielectric composition is applied in an embodiment of the present disclosure.

When an amount of the third minor component exceeds 4.0 mol, relative to 100 mol of Ti of the main component, high-temperature withstand voltage characteristics may be deteriorated due to occurrence of a pyrochlore ($RE_2Ti_2O_7$) (where, RE is at least one element of Y, Dy, Ho, Sm, Gd, Er, La, Ce, or Nd) secondary phase.

e) Fourth Minor Component

According to an embodiment of the present disclosure, a dielectric composition may include an oxide including Al as a fourth minor component.

The dielectric composition may further include the fourth minor component in an amount of 0.5 mol or less, relative to 100 mol of Ti of the main component. The fourth minor component may be in an oxide including Al.

An amount of the fourth minor component may be an amount of the Al element included in the dielectric composition as the fourth minor component, without distinguishing an addition form such as glass, oxides, or carbonates.

The fourth minor component may play a role in lowering a baking temperature and improving high-temperature withstand voltage characteristics of a multilayer ceramic capacitor to which the dielectric composition is applied.

When an amount of the fourth minor component exceeds 0.5 mol, relative to 100 mol of the main component, it may not be desirable due to problems such as decreases in sinterability and density, occurrence of a secondary phase, or the like.

Multilayer Electronic Component

Figure 1:
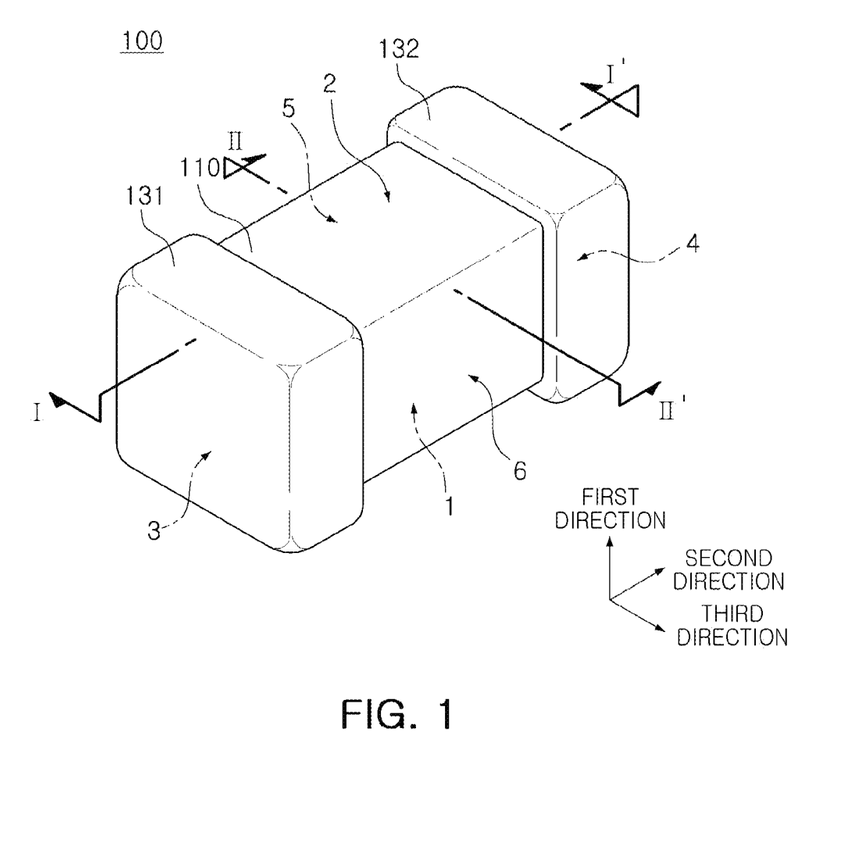
FIG. 1 is a perspective view schematically illustrating a multilayer electronic component according to an embodiment of the present disclosure.

FIG. 1 is a perspective view schematically illustrating a multilayer electronic component according to an embodiment of the present disclosure.

Figure 2:
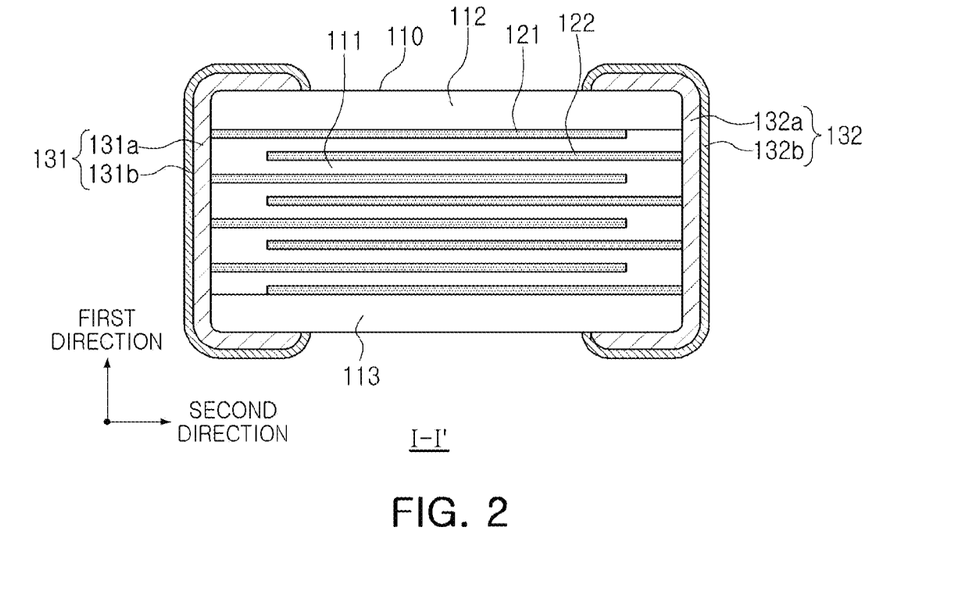
FIG. 2 is a cross-sectional view schematically illustrating the embodiment of FIG. 1, taken along line I-I'.

FIG. 2 is a cross-sectional view schematically illustrating the embodiment of FIG. 1, taken along line I-I'.

Figure 3:
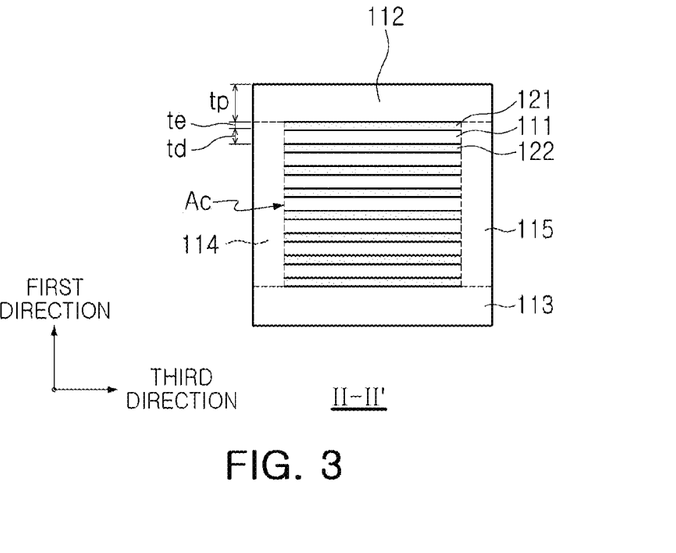
FIG. 3 is a cross-sectional view schematically illustrating the embodiment of FIG. 1, taken along line II-II'.

FIG. 3 is a cross-sectional view schematically illustrating the embodiment of FIG. 1, taken along line II-II'.

Figure 4:
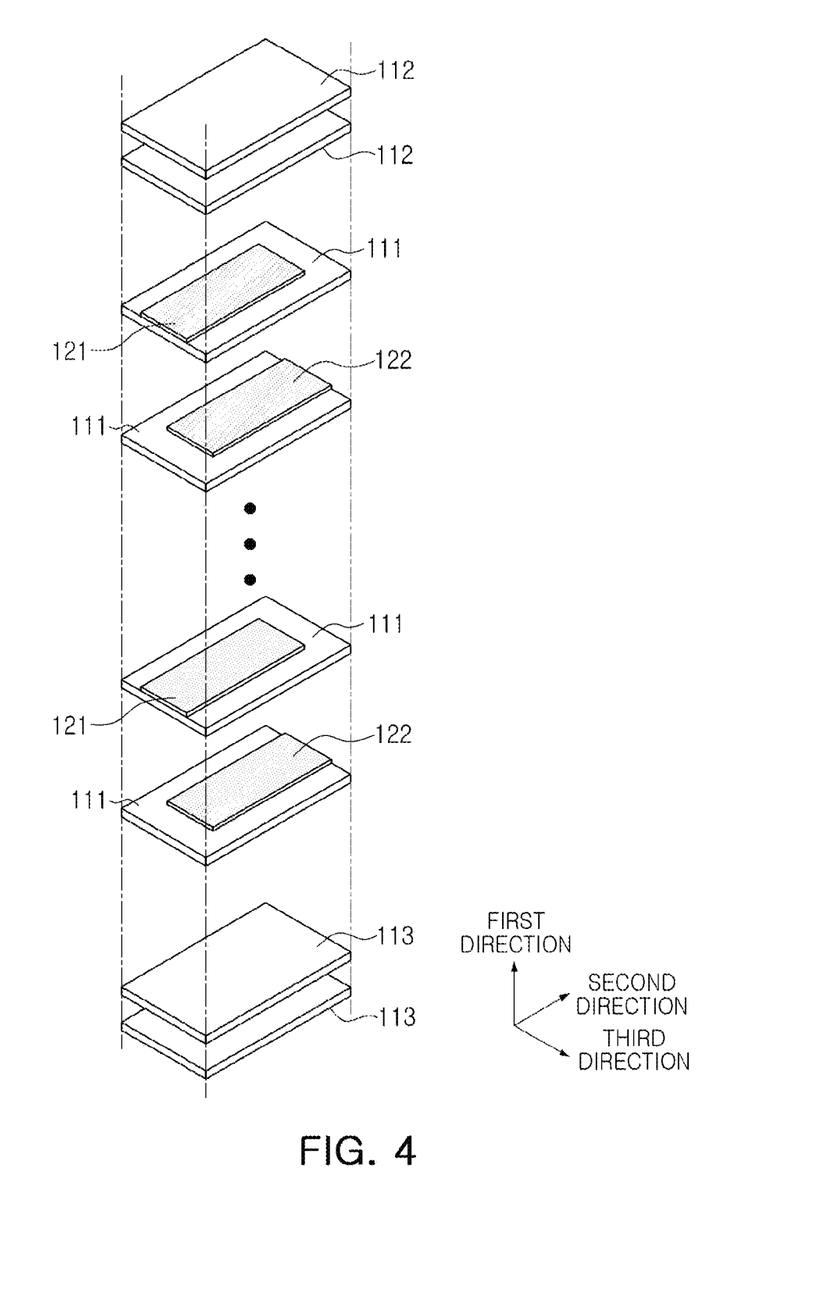
FIG. 4 is an exploded perspective view schematically illustrating a body of a multilayer electronic component according to an embodiment of the present disclosure.

FIG. 4 is an exploded perspective view schematically illustrating a body of a multilayer electronic component according to an embodiment of the present disclosure.

Figure 5:
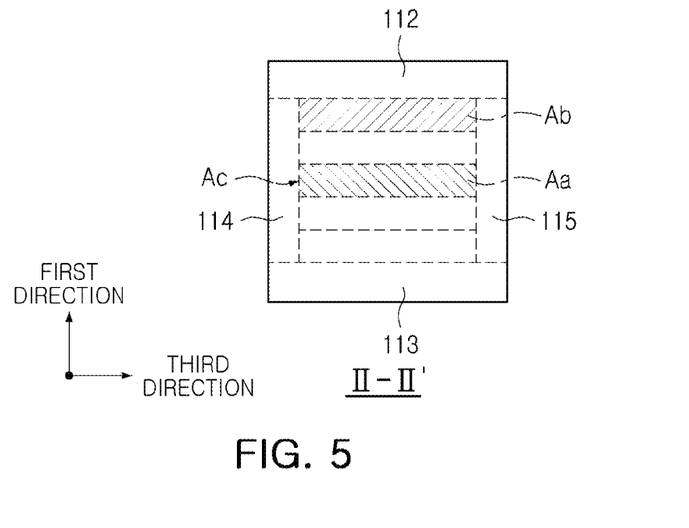
FIG. 5 is a cross-sectional view schematically illustrating the embodiment of FIG. 3 to illustrate components of the present disclosure.

FIG. 5 is a cross-sectional view schematically illustrating the embodiment of FIG. 3 to illustrate components of the present disclosure.

Hereinafter, a multilayer electronic component according to an embodiment of the present disclosure will be described in detail with reference to FIGS. 1 to 5. However, portions overlapping the descriptions in the above-described dielectric composition will be omitted to avoid redundant descriptions. In addition, although a multilayer ceramic capacitor is described as an example of the multilayer electronic component, the present disclosure may be applied to various electronic products using the above-described dielectric composition, for example, an inductor, a piezoelectric element, a varistor, a thermistor, or the like.

A multilayer electronic component 100 according to an embodiment of the present disclosure may include a plurality of dielectric layers 111, first and second surfaces 1 and 2 opposed in a first direction, third and fourth surfaces 3 and 4 connected to the first and second surfaces and opposed in a second direction, and fifth and sixth surfaces 5 and 6 connected to the first to fourth surfaces and opposed in a third direction; and external electrodes 131 and 132 disposed on the third and fourth surfaces, wherein the body may include a capacitance formation portion Ac including internal electrodes 121 and 122 alternately arranged with the dielectric layer, and cover portions 112 and 113 arranged above and below the capacitance formation portion in the first direction, wherein, if a central portion of the capacitance formation portion is Aa, a boundary portion of the capacitance formation portion, adjacent to the cover portions, is Ab, a dielectric grain size corresponding to the top 50% of dielectric grains, in order of enlargement, from the smallest grain size, among a plurality of dielectric grains included in Aa, is D50a, and a dielectric grain size corresponding to the top 50% of dielectric grains, in order of enlargement, from the smallest grain size, among a plurality of dielectric grains included in Ab, is D50b, D50a may be 190 nm or less and D50b may be 120 nm or greater.

In the body 110, the dielectric layer 111 and the internal electrodes 121 and 122 may be alternately stacked.

Although the specific shape of the body 110 is not particularly limited, as illustrated, the body 110 may have a hexahedral shape or the like. Due to shrinkage of ceramic powder particles contained in the body 110 during a baking process, the body 110 may not have a perfectly hexahedral shape with completely straight lines, but may have a substantially hexahedral shape overall.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 may be in a sintered state, and boundaries between adjacent dielectric layers 111 may be apparent without using a scanning electron microscope (SEM).

A raw material for forming the dielectric layer 111 is not particularly limited. For example, the dielectric layer 111 may be formed using the above-described dielectric composition.

Dielectric components applied to the multilayer electronic component may be analyzed, for example, by the following method. In a destructive method, the multilayer electronic component may be crushed, the internal electrode may be removed, the dielectric may be selected, and components of the selected dielectric may be analyzed using an inductively coupled plasma spectroscopy (ICP-OES) or an inductively coupled plasma mass spectrometer (ICP-MS). In a non-destructive method, the components may be analyzed in a central portion of a chip using TEM-EDS.

The body 110 may include a first internal electrode 121 and a second internal electrode 122, disposed in the body 110 and disposed to oppose each other with the dielectric layer 111 interposed therebetween, and may include a capacitance formation portion Ac in which capacitance is formed, and the cover portions 112 and 113 formed above and below the capacitance formation portion Ac in the first direction.

In addition, the capacitance formation portion Ac may be a portion contributing to formation of capacitance of the capacitor, and may be formed by repeatedly stacking the plurality of first and second internal electrodes 121 and 122 with the dielectric layer 111 interposed therebetween.

The cover portions 112 and 113 may include an upper cover portion 112 disposed above the capacitance formation portion Ac in the first direction and a lower cover portion 113 disposed below the capacitance formation portion Ac in the first direction.

The upper cover portion 112 and the lower cover portion 113 may be formed by stacking a single dielectric layer or two or more dielectric layers on upper and lower surfaces of the capacitance formation portion Ac in the thickness direction, respectively, and may basically play a role in preventing damage to the internal electrode due to physical or chemical stress.

The upper cover portion 112 and the lower cover portion 113 may not include internal electrodes, and may include the same material as the dielectric layer 111.

For example, the upper cover portion 112 and the lower cover portion 113 may include a ceramic material, for example, a barium titanate ($BaTiO_3$)-based ceramic material.

A thickness of the cover portions 112 and 113 need not be particularly limited. A thickness tp of each of the cover portions 112 and 113 may be 20 μm or less to more easily achieve relatively small size and relatively high capacitance of the multilayer electronic component.

In addition, margin portions 114 and 115 may be disposed on lateral surfaces of the capacitance formation portion Ac.

The margin portions 114 and 115 may include a margin portion 114 disposed on the fifth surface 5 of the body 110 and a margin portion 115 disposed on the sixth surface 6 of the body 110. For example, the margin portions 114 and 115 may be disposed on both lateral surfaces of the ceramic body 110 in the width direction.

As illustrated in FIG. 3, the margin portions 114 and 115 may refer to regions between both ends of the first and second internal electrodes 121 and 122, and an external surface of the body 110, in a cross-section of the body 110 cut in a width-thickness (WT) direction.

The margin portions 114 and 115 may basically play a role in preventing damage to the internal electrodes due to physical or chemical stress.

The margin portions 114 and 115 may be formed by applying a conductive paste to a ceramic green sheet to form the internal electrodes, except for a portion in which the margin portions are formed.

In addition, in order to suppress a step difference caused by the internal electrodes 121 and 122, after stacking, the internal electrodes may be cut to be exposed from the fifth and sixth surfaces 5 and 6 of the body 110, and then a single dielectric layer or two dielectric layers may be stacked on both lateral surfaces of the capacitance formation portion Ac in the width direction (the third direction), to form margin portions 114 and 115.

when a central portion of the capacitance formation portion Ac is Aa, a boundary portion of the capacitance formation portion Ac, adjacent to the cover portions is Ab, a dielectric grain size corresponding to the top 50% of dielectric grains, in order of enlargement, from the smallest grain size, among a plurality of dielectric grains included in Aa, is D50a, and a dielectric grain size corresponding to the top 50% of dielectric grains, in order of enlargement, from the smallest grain size, among a plurality of dielectric grains included in Ab, is D50b, D50a may be 190 nm or less and D50b may be 120 nm or greater. D50a and D50b may be median values where half of the population of the particle resides above this point, and half resides below this point. D50a and D50b may be a volume average particle size.

When D50a is more than 190 nm, a nominal capacitance may decrease, and a breakdown voltage may decrease. In addition, when D50b is less than 120 nm, a variation in size of dielectric grains between the central portion Aa and the boundary portion Ab of the capacitance formation portion may increase to increase a dissipation factor (DF). In this case, the dissipation factor (DF) refers to a measure representing power consumed by the capacitor itself.

In this case, a difference between D50a and D50b may be 61 nm or less. When the difference between D50a and D50b exceeds 61 nm, the dissipation factor (DF) may increase.

In an embodiment, in the cross-section cut in the first and third directions from a center of the body in the second direction, Aa may be a region including five (5) dielectric layers disposed around a ½ point of the capacitance formation portion in the first direction, and Ab may be a region including five (5) dielectric layers of the capacitance formation portion, adjacent to the cover portions.

More specifically, with reference to FIG. 5, in the cross-section cut in the first and third directions from the center of the body 110 in the second direction, an image of a region Aa including five (5) dielectric layers disposed around a ½ point of the capacitance formation portion Ac in the first direction, and an image of a region Ab including five (5) dielectric layers of the capacitance formation portion, adjacent to the cover portions, may be scanned with a scanning electron microscope (SEM), and sizes of dielectric grains may be then measured. In this case, a size of each of the dielectric grains may be referred to as a value obtained by measuring an area of each of the dielectric grains to be converted into a circle equivalent diameter having the measured area.

In an embodiment, an average size of the plurality of dielectric grains included in Aa may be 300 nm or less, an average size of the plurality of dielectric grains included in Ab may be 130 nm or more, and a difference between the average size of the plurality of dielectric grains included in Aa and the average size of the plurality of dielectric grains included in Ab may be 100 nm or less.

A thickness td of the dielectric layer 111 is not particularly limited.

In general, when the dielectric layer is formed to have a thickness of less than 0.6 μm, in particular, when the thickness of the dielectric layer is 0.45 μm or less, reliability may decrease.

As described above, according to an embodiment of the present disclosure, since effects such as a decrease in dissipation factor (DF), suppression of a decrease in nominal capacitance, improvement of a breakdown voltage, or the like may be secured, excellent reliability may be secured even when the thickness of the dielectric layer 111 is 0.45 μm or less.

Therefore, when the thickness of the dielectric layer 111 is 0.45 μm or less, the reliability improvement effect according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a cross-section in the length and thickness direction (L-T) of the body 110 with a scanning electron microscope (SEM).

For example, for an arbitrary dielectric layer extracted from an image in which cross-sections in the first and second directions (the length and thickness directions) cut from the central portion of the body 110 in the third direction (the width direction) are scanned with a scanning electron microscope (SEM), thicknesses thereof may be measured at thirty (30) equally spaced points in the longitudinal direction to have average values.

The thicknesses measured at thirty (30) equally spaced points may be measured in the capacitance formation portion Ac, which refers to a region in which the first and second internal electrodes 121 and 122 overlap each other.

The internal electrodes 121 and 122 may be alternately stacked with the dielectric layer 111.

The internal electrodes 121 and 122 may include first and second internal electrodes 121 and 122. The first and second internal electrodes 121 and 122 may be alternately disposed to oppose each other with the dielectric layer 111, constituting the body 110, interposed therebetween, and may be exposed from the third and fourth surfaces 3 and 4 of the body 110, respectively.

Referring to FIG. 2, the first internal electrode 121 may be spaced apart from the fourth surface 4 and may be exposed from the third surface 3, and the second internal electrode 122 may be spaced apart from the third surface 3 and may be exposed from the fourth surface 4.

In this case, the first and second internal electrodes 121 and 122 may be electrically separated from each other by the dielectric layer 111 disposed therebetween.

Referring to FIG. 4, a body 110 may be formed by alternately stacking a ceramic green sheet on which a first internal electrode 121 is printed and a ceramic green sheet on which a second internal electrode 122 is printed, and sintering the same.

A material for forming the internal electrodes 121 and 122 is not particularly limited. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode containing one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste, a screen-printing method, a gravure printing method, or the like may be used, but the present disclosure is not limited thereto.

A thickness te of each of the internal electrodes 121 and 122 is not particularly limited.

In general, when each of the internal electrodes is formed to have a thickness of less than 0.6 μm, in particular, when the thickness of the internal electrode is 0.45 μm or less, reliability may decrease.

As described above, according to an embodiment of the present disclosure, since effects such as a decrease in dissipation factor (DF), suppression of a decrease in nominal capacitance, improvement of a breakdown voltage, or the like may be secured, excellent reliability may be secured even when the thickness of each of the internal electrodes 121 and 122 is 0.45 μm or less.

Therefore, when the thickness of each of the internal electrodes 121 and 122 is 0.45 μm or less, the effect according to the present disclosure may be more remarkable, and relatively small size and relatively high capacitance of the multilayer electronic component may be more easily achieved.

The thickness te of each of the internal electrodes 121 and 122 refer to an average thickness of each of the internal electrodes 121 and 122.

The average thickness of each of the internal electrodes 121 and 122 may be measured by scanning an image of a cross-section in the length and thickness direction (L-T) of the body 110 with a scanning electron microscope (SEM).

For example, for respective arbitrary internal electrodes 121 and 122 extracted from an image in which cross-sections in the first and second directions (the length and thickness directions) cut from the central portion of the body 110 in the third direction (the width direction) are scanned with a scanning electron microscope (SEM), thicknesses thereof may be measured at thirty (30) equally spaced points in the longitudinal direction to have average values.

The thirty (30) equally spaced points may be measured in the capacitance formation portion Ac, which refers to a region in which the internal electrodes 121 and 122 overlap each other.

The external electrodes 131 and 132 may be disposed on the third surface 3 and the fourth surface 4 of the body 110.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover both end surfaces of the side margins 114 and 115 in the second direction.

Although a structure in which the multilayer electronic component 100 has two external electrodes 131 and 132 is described in this embodiment, the number, a shape, or the like of the external electrodes 131 and 132 may be changed, depending on a shape of the internal electrodes 121 and 122 or other purposes.

The external electrodes 131 and 132 may be formed using various materials having electrical conductivity such as metal, and a specific material may be determined in consideration of electrical characteristics, structural stability, or the like.

For example, the external electrodes 131 and 132 may include electrode layers 131a and 132a disposed on the body 110, and plating layers 131b and 132b formed on the electrode layers 131a and 132a as depicted in FIG. 2.

For a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the body. In addition, the electrode layers 131a and 132a may be formed by transferring a sheet including a conductive metal onto the body 110 or by transferring a sheet including a conductive metal onto the sintered electrode.

A material having excellent electrical conductivity may be used as a conductive metal included in the electrode layers 131a and 132a, and the material is not particularly limited. For example, the conductive metal may include one or more of nickel (Ni), copper (Cu), or alloys thereof.

The plating layers 131b and 132b may play a role in improving mounting characteristics. The type of the plating layers 131b and 132b is not particularly limited, may include a plating layer including at least one of Ni, Sn, Pd, or alloys thereof, and may be formed of a plurality of layers.

For a more specific example of the plating layers 131b and 132b, the plating layers 131b and 132b may include an Ni plating layer or an Sn plating layer, and the Ni plating layer and the Sn plating layer may be sequentially formed on the electrode layers 131a and 132a. In addition, an Sn plating layer, an Ni plating layer, and an Sn plating layer may be sequentially formed. In addition, the plating layers 131b and 132b may include a plurality of Ni plating layers and/or a plurality of Sn plating layers.

A size of the multilayer electronic component 100 is not particularly limited.

In order to achieve relatively small size and relatively high capacitance at the same time, it may be necessary to increase the number of stacks by reducing a thickness of a dielectric layer and a thickness of an internal electrode. Therefore, a multilayer electronic component 100 having a size of 0402 (length×width, 0.4 mm×0.2 mm) or less may have more remarkable effects of improving reliability and insulation resistance according to the present disclosure.

Therefore, when a multilayer electronic component 100 has a length of 0.44 mm or less and a width of 0.22 mm or less, in consideration of manufacturing errors, a size of an external electrode, an effect of improving reliability according to the present disclosure may be more remarkable. In this case, the length of the multilayer electronic component 100 refers to a maximum size of the multilayer electronic component 100 in the second direction, and the width of the multilayer electronic component 100 refers to a maximum size of the multilayer electronic component 100 in the third direction.

Example

In an example of the present disclosure, after preparing a dielectric composition including barium titanate ($BaTiO_3$) as a main component and Zr and Cu in amounts illustrated in Table 1, relative to 100 mol of Ti of the main component, a ceramic green sheet including the dielectric composition was used to prepare a prototype multilayer ceramic capacitor (prototype MLCC) having a dielectric layer formed thereon.

Nominal capacitance (Cp), a dissipation factor (DF) and a breakdown voltage (BDV) were measured for test numbers 1 to 4, prototype multilayer ceramic capacitor (prototype MLCC) specimens prepared as described above, and listed in the following Table 1.

The prototype multilayer ceramic capacitor (prototype MLCC) specimens were heated to 150° C., maintained at 25° C. for 2 hours, and Cp and DF thereof were then measured under the conditions of 1 Khz and 0.5 Vac using an LCR meter.

In BDV, 10 mA was used as a limit current and a voltage was applied, to measure BDV as BDV at which the voltage reaches 10 mA.

In addition, referring to FIG. 5, in a cross-section cut in the first and third directions from the center of each of the sample chips in the second direction, an image of a region Aa including five (5) dielectric layers disposed around a ½ point of the capacitance formation portion Ac in the first direction, and an image of a region Ab including five (5) dielectric layers of the capacitance formation portion, adjacent to the cover portions, were scanned with a scanning electron microscope (SEM), sizes of dielectric grains were then measured, respectively, and results therefrom are listed in Table 2 below. In this case, a size of each of the dielectric grains may be referred to as a value obtained by measuring an area of each of the dielectric grains to be converted into a circle equivalent diameter having the measured area.

In Table 2 below, Dn refers to a size of each of the dielectric grains corresponding to top n %, in order of enlargement, from the smallest grain size. For example, D50 refers to a size of each of the dielectric grains corresponding to the top 50%, in order of enlargement, from the smallest grain size. In addition, D50a refers to a size of each of the dielectric grains corresponding to the top 50%, in order of enlargement, from the smallest grain size, among the plurality of dielectric grains included in Aa, and D50b refers to a size of each of the dielectric grains corresponding to the top 50%, in order of enlargement, from the smallest grain size, among the plurality of dielectric grains included in Ab.

TABLE 1

| Test No. | 1* | 2* | 3 | 4 |
|---|---|---|---|---|
| Zr (mol) | 0 | 1.0 | 1.0 | 1.0 |
| Zn (mol) | 0 | 0 | 0.21 | 0.5 |
| Cp (μF) | 2.51 | 1.91 | 2.03 | 2.04 |
| DF (%) | 6.56 | 5.14 | 5.38 | 5.56 |
| BDV (V) | 93.3 | 90.8 | 104.3 | 101.1 |

TABLE 2

| | Test No. | | | | | | | |
|---|---|---|---|---|---|---|---|---|
| | 1* | | 2* | | 3 | | 4 | |
| Position | Aa | Ab | Aa | Ab | Aa | Ab | Aa | Ab |
| D1(nm) | 102 | 47 | 91 | 53 | 91 | 46 | 89 | 51 |
| D10(nm) | 139 | 71 | 114 | 81 | 108 | 72 | 110 | 80 |
| D50(nm) | 287 | 113 | 194 | 133 | 182 | 121 | 186 | 130 |
| D90(nm) | 593 | 190 | 352 | 269 | 364 | 225 | 361 | 238 |
| Standard Deviation | 176 | 50 | 96 | 76 | 104 | 68 | 101 | 69 |
| Average | 331 | 124 | 215 | 155 | 212 | 139 | 213 | 148 |
| CV(Standard Deviation/Average) | 0.531 | 0.408 | 0.448 | 0.492 | 0.490 | 0.488 | 0.472 | 0.466 |
| D50a-D50b(nm) | 173 | | 61 | | 61 | | 57 | |

Comparing Test No. 1 and Test No. 2, it can be seen that average sizes of dielectric grains of Aa decreased by the addition of Zr, and distribution of grain sizes by position decreased, as average sizes of dielectric grains of Ab increase. It can be seen that distribution of grain sizes by position was significantly lowered, as D50a-D50b values were reduced from 173 nm to 61 nm. In addition, it can be seen that DF values decreased accordingly.

In Test No. 2, it can be seen that a negative effect of decreasing nominal capacitance and lowering withstand voltages occurs, as compared to Test No. 1.

Test Nos. 3 and 4 were cases in which Zn and Zr were added in combination. It can be seen that distribution of grain sizes by position was improved, and BDV was also improved while securing nominal capacitance.

Comparing Test No. 3 and Test No. 4, it can be seen that D50 increased and BDV slightly decreased, as Zn increased from 0.21 mol to 0.5 mol. Therefore, it can be seen that an amount of Zn is preferable to be higher than 0.2 mol to 0.5 mol or less, in consideration of securing nominal capacitance, reducing DF, and improving BDV characteristics.

In addition, it can be seen that, in Test Nos. 3 and 4, D50a (D50 of Aa) was 190 nm or less, D50b (D50 of Ab) was 120 nm or more, and had better nominal capacitance and BDV characteristics, as compared to Test No. 2.

In addition, it can be seen that, in Test Nos. 2 to 4, D50a-D50b was 61 or less, and DF value was 1% or more lower, as compared to Test No. 1 in which D50a-D50b was 173.

Figure 6A:
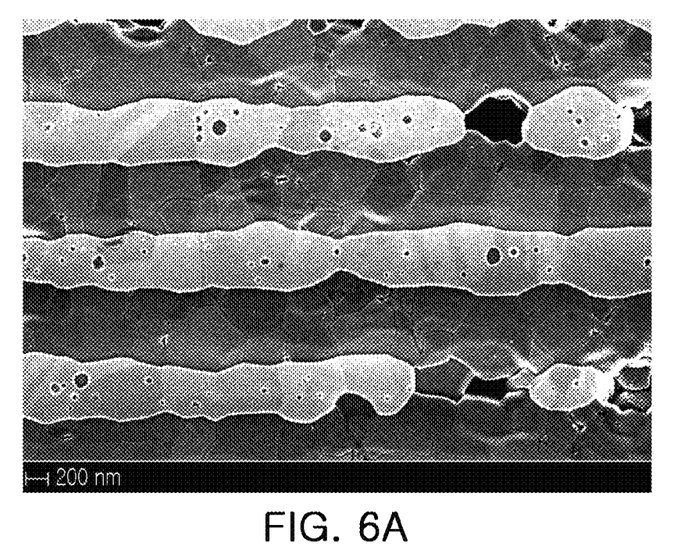
FIG. 6A is an image obtained by scanning a portion Aa of Test No. 1 with a scanning electron microscope.
Figure 6B:
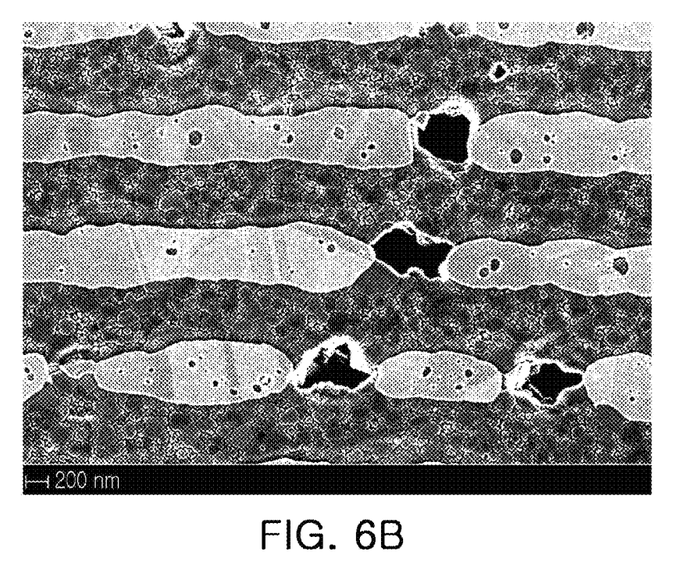
FIG. 6B is an image obtained by scanning a portion Ab of Test No. 1 with a scanning electron microscope.
Figure 7A:
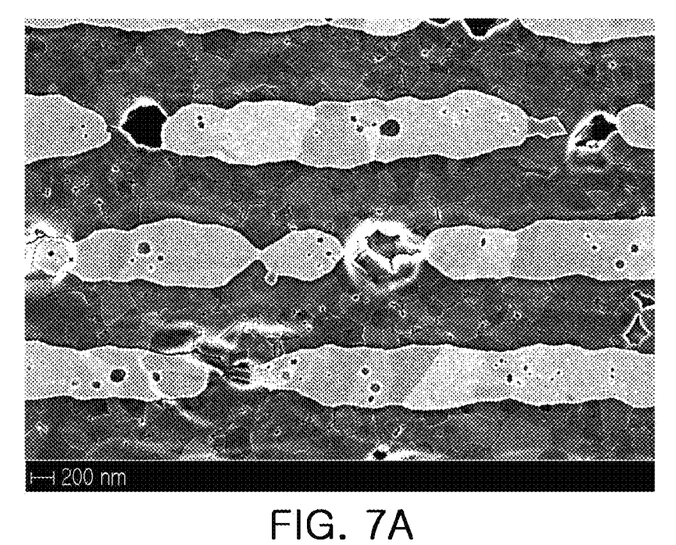
FIG. 7A is an image obtained by scanning a portion Aa of Test No. 2 with a scanning electron microscope.
Figure 7B:
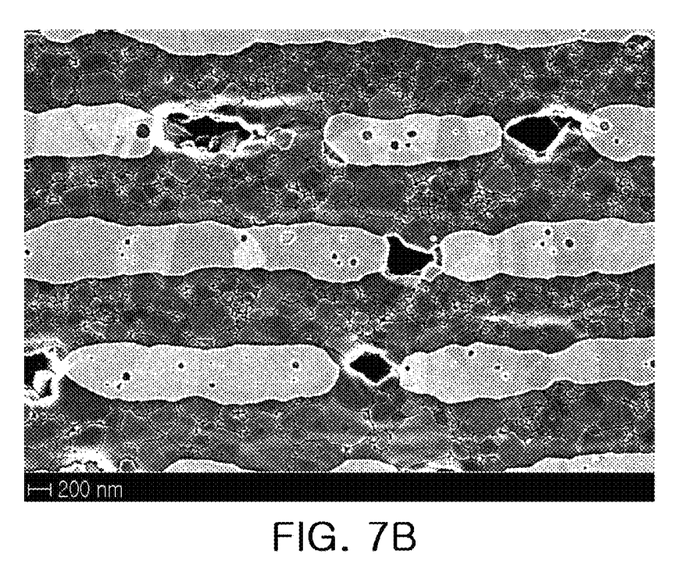
FIG. 7B is an image obtained by scanning a portion Ab of Test No. 2 with a scanning electron microscope.
Figure 8A:
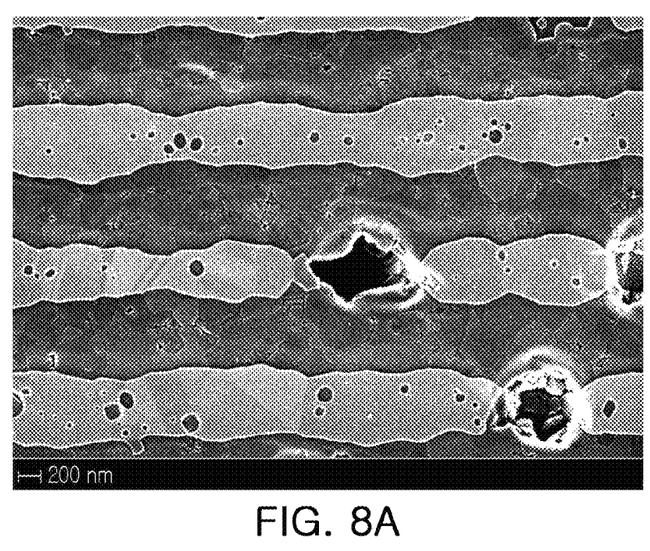
FIG. 8A is an image obtained by scanning a portion Aa of Test No. 3 with a scanning electron microscope.
Figure 8B:
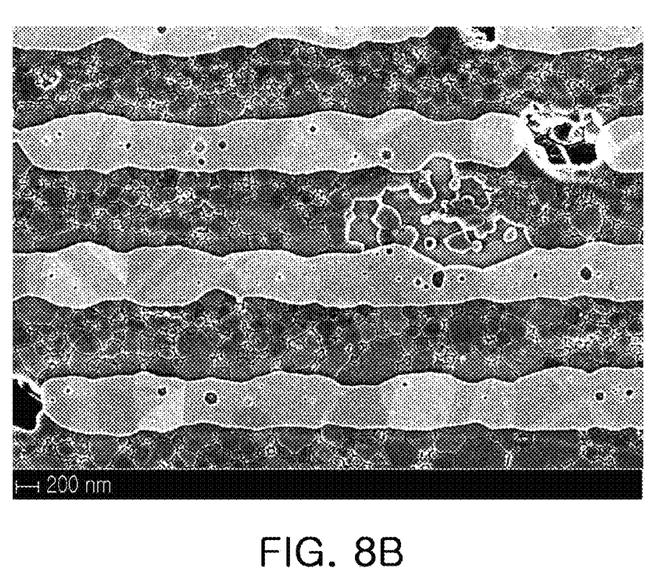
FIG. 8B is an image obtained by scanning a portion Ab of Test No. 3 with a scanning electron microscope.
Figure 9A:
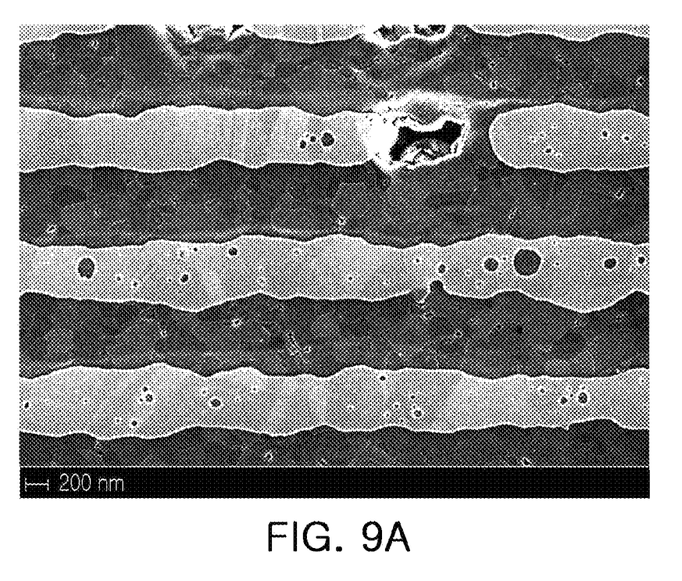
FIG. 9A is an image obtained by scanning a portion Aa of Test No. 4 with a scanning electron microscope.
Figure 9B:
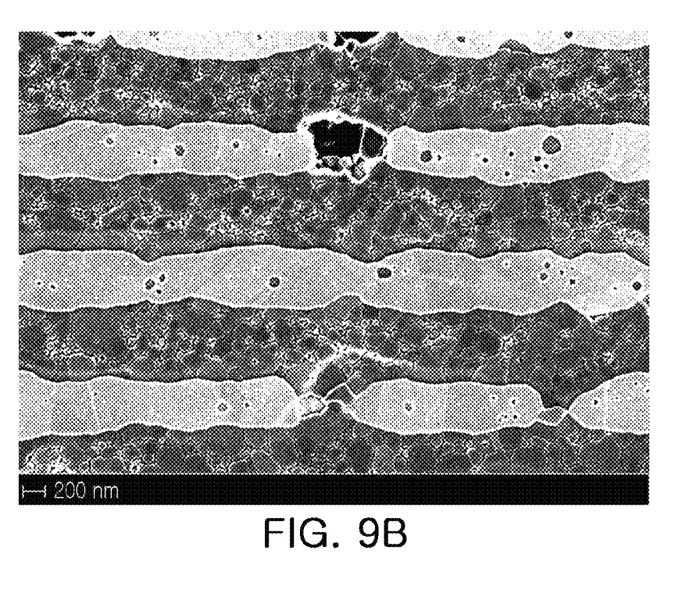
FIG. 9B is an image obtained by scanning a portion Ab of Test No. 4 with a scanning electron microscope.

FIG. 6A is an image obtained by scanning a portion Aa of Test No. 1 with a scanning electron microscope, and FIG. 6B is an image obtained by scanning a portion Ab of Test No. 1 with a scanning electron microscope. FIG. 7A is an image obtained by scanning a portion Aa of Test No. 2 with a scanning electron microscope, and FIG. 7B is an image obtained by scanning a portion Ab of Test No. 2 with a scanning electron microscope. FIG. 8A is an image obtained by scanning a portion Aa of Test No. 3 with a scanning electron microscope, and FIG. 8B is an image obtained by scanning a portion Ab of Test No. 3 with a scanning electron microscope. FIG. 9A is an image obtained by scanning a portion Aa of Test No. 4 with a scanning electron microscope, and FIG. 9B is an image obtained by scanning a portion Ab of Test No. 4 with a scanning electron microscope.

Comparing FIGS. 6 to 9, it can be seen that average sizes of dielectric grains of Aa decreased due to addition of Zr, and distribution of grain sizes by position decreased, as average sizes of dielectric grains of Ab increased. In addition, as described above, it can be seen that, when referring to Tables 1 and 2, Test Nos. 3 and 4 had D50a (D50 of Aa) of 190 nm or less, and D50b (D50 of Ab) of 120 nm or more, and nominal capacitance and BDV characteristics were superior, compared to Test No. 2.

According to an aspect of the present disclosure, Zn and Zr may be added together to realize a uniform non-granular growth system of dielectric grains and densification at a low temperature, to minimize a decrease in capacitance and control microstructure distribution by position.

According to an aspect of the present disclosure, a size of a dielectric grain for each position may be controlled to suppress a decrease in capacitance, reduce a dissipation factor (DF), and improve a breakdown voltage.

According to an aspect of the present disclosure, Zn and Zr may be added in combination to provide a dielectric composition and a multilayer electronic component, having similar dielectric properties and grain distribution even with a change in sintering conditions.

However, various advantages and effects of the present disclosure may not be limited to the above-described contents, and may be more easily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers, first and second surfaces opposed in a first direction, third and fourth surfaces connected to the first and second surfaces and opposed in a second direction, and fifth and sixth surfaces connected to the first to fourth surfaces and opposed in a third direction; and
external electrodes disposed on the third and fourth surfaces,
wherein the body includes a capacitance formation portion including an internal electrode alternately arranged with the dielectric layer, and cover portions arranged above and below the capacitance formation portion in the first direction,
wherein, when a central portion of the capacitance formation portion is Aa, a boundary portion of the capacitance formation portion, adjacent to the cover portions, is Ab, a dielectric grain size corresponding to the top 50% of dielectric grains, in order of enlargement, from a smallest grain size, among a plurality of dielectric grains included in Aa, is D50a, and a dielectric grain size corresponding to the top 50% of dielectric grains, in order of enlargement, from a smallest grain size, among a plurality of dielectric grains included in Ab, is D50b, D50a is 190 nm or less and D50b is 120 nm or greater, and
wherein D50a and D50b are different.

2. The multilayer electronic component of claim 1, wherein a difference between D50a and D50b is 61 nm or less.

3. The multilayer electronic component of claim 2, wherein, in a cross-section cut in the first and third directions from a center of the body in the second direction,
Aa is a region including five (5) dielectric layers disposed around a ½ point of the capacitance formation portion in the first direction, and
Ab is a region including five (5) dielectric layers of the capacitance formation portion, adjacent to the cover portions.

4. The multilayer electronic component of claim 3, wherein an average size of the plurality of dielectric grains included in Aa is 300 nm or less,
an average size of the plurality of dielectric grains included in the Ab is 130 nm or more,
wherein a difference between the average size of the plurality of dielectric grains included in Aa and the average size of the plurality of dielectric grains included in Ab is 100 nm or less.

5. The multilayer electronic component of claim 1, wherein an average thickness of the dielectric layer is 0.45 µm or less.

6. The multilayer electronic component of claim 1, wherein an average thickness of the internal electrode is 0.45 µm or less.

7. The multilayer electronic component of claim 1,
wherein the dielectric layer comprises a dielectric composition including a $BaTiO_3$ main component and a first minor component,
wherein the first minor component includes Zn and Zr,
wherein an amount of Zn is higher than 0.2 mol and 0.5 mol or less, relative to 100 mol of Ti of the main component, and
an amount of Zr is higher than 0 mol and 2 mol or less, relative to 100 mol of Ti of the main component.

8. The multilayer electronic component of claim 7,
wherein the dielectric composition comprises a second minor component including at least one element of Mn, V, Cr, Fe, Ni, Co, or Cu in an amount of 0.1 mol or higher and 2.0 mol or less, relative to 100 mol of Ti of the main component.

9. The multilayer electronic component of claim 8,
wherein the dielectric composition comprises a third minor component including at least one element of Y, Dy, Ho, Sm, Gd, Er, La, Ce, Tb, Tm, Yb, or Nd in an amount of 4.0 mol or less, relative to 100 mol of Ti of the main component.

10. The multilayer electronic component of claim 9,
wherein the dielectric composition comprises a fourth minor component including an oxide including Al in an amount of t 0.5 mol or less, relative to 100 mol of Ti of the main component.

11. A dielectric composition comprising a $BaTiO_3$ main component and a first minor component,
wherein the first minor component includes Zn and Zr,
wherein an amount of Zn is higher than 0.2 mol and 0.5 mol or less, relative to 100 mol of Ti of the main component,
wherein an amount of Zr is higher than 0 mol and 2 mol or less, relative to 100 mol of Ti of the main component, and
wherein an average particle diameter of particles of the main component is 100 nm or less.

12. The dielectric composition of claim 11, further comprising a second minor component including at least one element of Mn, V, Cr, Fe, Ni, Co, or Cu in an amount of 0.1 mol or higher and 2.0 mol or less, relative to 100 mol of Ti of the main component.

13. The dielectric composition of claim 12, further comprising a third minor component including at least one element of Y, Dy, Ho, Sm, Gd, Er, La, Ce, Tb, Tm, Yb, or Nd in an amount of 4.0 mol or less, relative to 100 mol of Ti of the main component.

14. The dielectric composition of claim 13, further comprising a fourth minor component including Al in an amount of 0.5 mol or less, relative to 100 mol of Ti of the main component,
wherein the amount of the fourth minor component is an atom % of Al, relative to 100 mol of Ti of the main component, and
Al included as the fourth minor component is in an oxide form.

15. The multilayer electronic component of claim 1, wherein D50a>D50b.

* * * * *